(12) United States Patent
Spicer et al.

(10) Patent No.: US 7,188,021 B2
(45) Date of Patent: Mar. 6, 2007

(54) ANGULAR POSITION SENSOR-BASED ENGINE CONTROLLER SYSTEM

(75) Inventors: Gary J. Spicer, Mississauga (CA); Zbyslaw Staniewicz, Coldwater (CA); Terry P. Cleland, Brampton (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

(21) Appl. No.: 11/146,727

(22) Filed: Jun. 7, 2005

(65) Prior Publication Data

US 2006/0089784 A1    Apr. 27, 2006

(51) Int. Cl.
*G06F 7/70* (2006.01)
*G06F 1/00* (2006.01)

(52) U.S. Cl. .................... 701/103; 701/110
(58) Field of Classification Search ............... 701/103, 701/104, 105, 110, 111
See application file for complete search history.

(56) References Cited

U.S. PATENT DOCUMENTS

| | | | |
|---|---|---|---|
| 5,080,066 A | | 1/1992 | Takeno et al. |
| 5,186,136 A | | 2/1993 | Kadomukai et al. |
| 5,321,979 A | * | 6/1994 | Mc Kendry et al. ....... 73/117.3 |
| 5,537,967 A | | 7/1996 | Tashiro et al. |
| 5,678,521 A | * | 10/1997 | Thompson et al. ......... 123/447 |
| 5,710,703 A | | 1/1998 | Kirn et al. |
| 5,860,406 A | | 1/1999 | Schmidt et al. |
| 5,979,413 A | | 11/1999 | Ohnuma et al. |
| 6,124,709 A | * | 9/2000 | Allwine .................... 324/207.2 |
| 6,208,131 B1 | * | 3/2001 | Cebis et al. ................. 324/165 |
| 6,305,353 B1 | * | 10/2001 | Weber et al. .......... 123/406.58 |
| 6,326,781 B1 | | 12/2001 | Kunde et al. |
| 6,404,185 B1 | * | 6/2002 | Allwine .................... 324/207.2 |
| 6,405,694 B2 | | 6/2002 | Sato |
| 6,541,959 B2 | * | 4/2003 | Gudgeon et al. ......... 324/207.15 |
| 6,570,265 B1 | * | 5/2003 | Shiraishi et al. .......... 290/40 C |

(Continued)

FOREIGN PATENT DOCUMENTS

EP    1 116 946 A2    7/2001

OTHER PUBLICATIONS

"Data Management in Real Time Systems: A Case of On Demand Updates In Vehicle Control Systems"; T. Gustafsson & J. Hansson; Proceeding of the 10th. IEEE Real Time and Embedded Technology and Applications Symposium, (RTAS '04), May 25-28, 2004.

(Continued)

*Primary Examiner*—John T. Kwon
(74) *Attorney, Agent, or Firm*—Clark Hill PLC

(57) ABSTRACT

An engine controller system employs angular position sensors which are operable to very accurately determine the position of rotating engine members. Information about the angular position of the engine members is used to alter operation of the engine for improved efficiency and/or reduced emissions from the engine. The angular position of the crankshaft and camshafts can be determined by affixing a dipole magnet to each of them such that the magnet field of the magnet rotates with the rotating member and then placing a angular position sensor adjacent each rotating member to detect the rotation of each magnetic field. In another embodiment, the angular position of each end of at least one of the rotating members is determined to allow the processor to determine the torsional deflection of the member and the engine controller system is responsive to that determined deflection to further alter operation of the engine.

30 Claims, 12 Drawing Sheets

U.S. PATENT DOCUMENTS

| | | |
|---|---|---|
| 6,586,929 B1 | 7/2003 | Luetzow |
| 6,650,992 B2 | 11/2003 | Jankovic et al. |
| 6,693,423 B2 | 2/2004 | Weser |
| 6,732,713 B1 | 5/2004 | Kanazawa et al. |
| 6,747,448 B2 * | 6/2004 | Berndt .................. 324/207.15 |
| 6,796,123 B2 * | 9/2004 | Lasker ......................... 60/520 |
| 6,806,702 B2 | 10/2004 | Lamb et al. |
| 2003/0020468 A1 | 1/2003 | Kato et al. |
| 2004/0160220 A1 | 8/2004 | Wendt |
| 2005/0030012 A1 | 2/2005 | Kunz-Vizenetz |

OTHER PUBLICATIONS

"A Normalization Scheme to Reduce Numerical Errors in Inverse Tangent Computations on a Fixed Point CORDIC Processor"; K. Kota, J.R. Cavallero; 1992 IEEE Symposium on Circuits and Systems, vol. 3, May 3-6, 1992, pp. 1061-1064.

* cited by examiner

FIG - 10D  FIG - 10E

ANGULAR POSITION SENSOR-BASED ENGINE CONTROLLER SYSTEM

FIELD OF THE INVENTION

The present invention relates to an engine controller system for an internal combustion engine. More specifically, the present invention relates to an engine controller system which obtains and processes angular position information relating to the operation of an internal combustion engine to control the operation of that engine.

BACKGROUND OF THE INVENTION

Engine controllers employing microprocessors are well known and have been commonly employed to control fuel injection and other engine systems in gasoline and diesel internal combustion engines. Generally, such controllers receive a variety of signals from sensors to determine, for example, the speed and/or position of the crankshaft, the mass flow rate of air entering the inlet manifold, the engine operating temperature, etc. The received signals are processed by the engine controller which then produces signals controlling the operation of the fuel injectors and/or other aspects of the operation of the engine.

While significant performance and operating economy improvements have been obtained from such engine controllers, problems do exist when attempts are made to further improve the performance and operating economies achieved with these systems. In particular, present engine controllers do not obtain or process, with sufficient accuracy, the angular position of various engine components, such as camshafts and/or crankshafts and this failure limits the performance achieved by such controllers.

SUMMARY OF THE INVENTION

It is an object of the present invention to provide a novel engine controller which obviates or mitigates at least one disadvantage of the prior art.

According to a first aspect of the present invention, there is provided an engine controller system for an engine comprising: at least one processor; and at least one angular position sensor for association with a rotating engine component, said sensor providing signals to said processor indicating the angular position of the component, wherein the processor processes said signals and produces at least one output control signal to alter operation of said engine.

Preferably, the signals from the angular position sensor comprise a pair of signals varying in a sinusoidal manner as the engine component rotates, one of the pair of signals being ninety degrees out of phase from the other of the signals, the signals providing an indication of the angular position of the rotating component within a three hundred and sixty degree complete rotation. Also preferably, the processor implements a CORDIC algorithm on the pair of sinusoidal signals to determine the angular position of the rotating component.

Also preferably, the engine controller system includes angular position sensors to determine at least the angular position of the camshafts of the engine. Also preferably, the engine controller system determines the angular position of the crankshaft of the engine.

Also preferably, the engine controller system includes two angular position sensors for a rotating engine member to determine the torsional deflection of the member, the engine controller responsive to the determined torsional deflection to alter operation of the engine.

BRIEF DESCRIPTION OF THE DRAWINGS

Preferred embodiments of the present invention will now be described, by way of example only, with reference to the attached Figures, wherein:

FIGS. 10A through 10E show some of the contemplated structures of dipole magnets for use in the present invention;

DETAILED DESCRIPTION OF THE INVENTION

Figure 1:
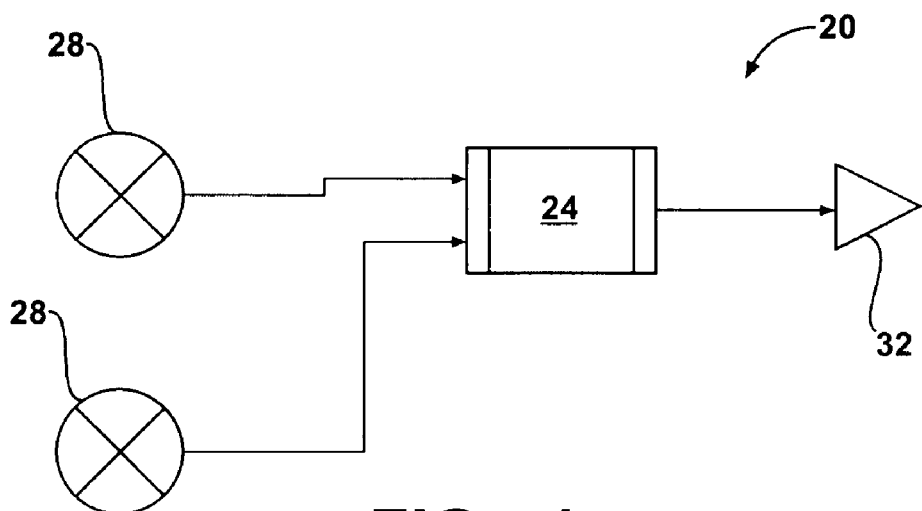
FIG. 1 shows a schematic representation of an engine controller system in accordance with the present invention.

An engine controller system in accordance with the present invention is indicated generally at 20 in FIG. 1. Engine controller system 20 includes at least one processor unit 24, at least one absolute angular position sensor 28 and an actuator 32 which is operated responsive to a control signal from processor unit 24.

As will be apparent to those of skill in the art, engine controller system 20 is not limited to only having one processor 24 and, in fact, system 20 can include multiple processors 24, including one or more processors 24 which can be dedicated to processing signals received from angular position sensors 28 and one or more processors 24 which can be dedicated to executing an engine component control algorithm, as discussed further below. In such a case, each processor 24 need not be the same as each other processor 24. For example, a processor 24 receiving signals from angular position sensor 28 can be a microcontroller with A/D converters, etc. while a processor 24 operating actuator 32 can include a floating point accelerator, large amounts of RAM, or other special purpose hardware as may be required.

In conventional engine control systems, rotation sensors are employed to estimate the position of rotating components. Such rotation sensors have comprised incremental encoder systems such as systems which count indicator teeth on a rotating shaft, typically via an inductive pickup or Hall Effect sensor located adjacent the teeth on the shaft or via an optical pickup which observes a reference disk (typically of alternating white and black indicia on the face of the reference disk) mounted on the shaft. Examples of such rotation sensor systems include crankshaft position sensors and camshaft position sensors.

Such rotation systems can provide a reasonable indication of an average rotational speed of an engine component and have been used to estimate angular position of engine components. However, such systems suffer from numerous disadvantages including an inability to determine or respond to transient (intra-tooth or other increment) speed changes and the inability to determine the angular position of a stopped rotating component 40. Also, when used in automotive applications, such systems are generally not able to produce an accurate output after start up of a rotating component 40 until a rotational speed of over three hundred RPM has been obtained.

Further, at best such systems have not been able to achieve better than about an eight degree accuracy in determining the angular position of an engine component rotating at typical engine operating speeds above 500 RPM and such systems are not able to determine angular positions with any substantial degree of accuracy at speeds below about 500 RPM.

Figure 2:
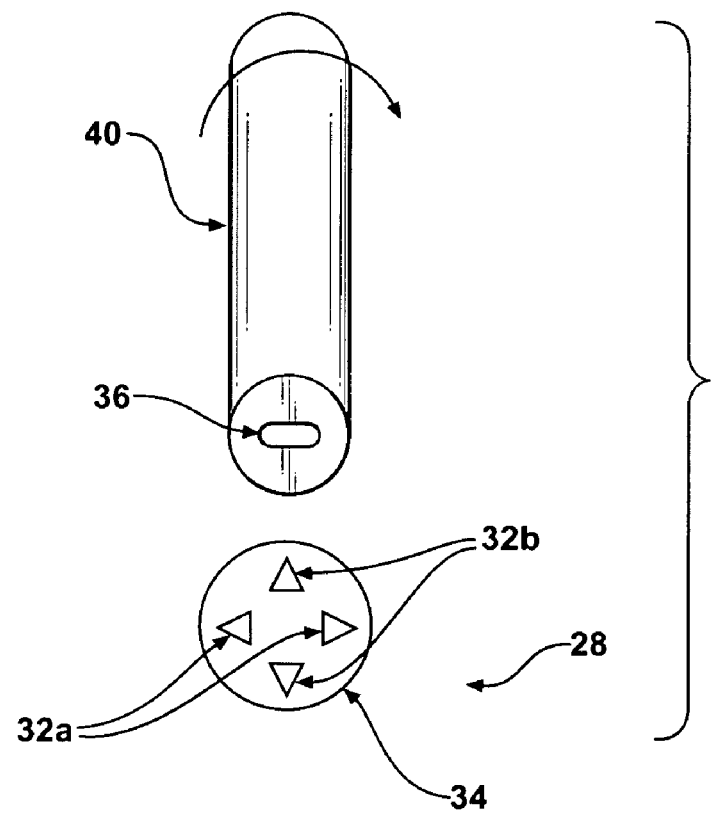
FIG. 2 shows a schematic representation of a rotating engine component and angular position sensor in accordance with an embodiment of the present invention.

As illustrated in FIG. 2, the present invention preferably employs angular position sensors 28 which employ two pairs 32a, 32b of oppositely orientated magnetic sensors and, in a preferred embodiment, these are Hall Effect sensors or the like. One pair 32a of these oppositely orientated magnetic sensors is arranged at right angles to the other pair 32b of oppositely oriented magnetic sensors and both pairs 32a, 32b of sensors are preferably mounted within a convenient package, such as a ceramic semiconductor "chip" type package 34.

When sensor package 34 is properly located adjacent a dipole magnet 36 arranged across the rotational axis of a rotating engine component 40, sensor package 40 outputs a signal from each pair 32a and 32b of sensors indicating the dipole field orientation with respect to an axis extending between the sensors in each respective pair 32a and 32b. When engine component 40 is rotated, rotating dipole magnet 36 with it, the output from each sensor pair 32a and 32b is a sinusoid, with the output of one sensor pair 32a being ninety degrees out of phase with the signal of the other sensor pair 32b. Such angular position sensors can output meaningful signals even when engine component 40 is stopped, or rotating at low speeds.

As used herein, the term dipole magnet is intended to comprise any magnetic structure, or arrangement of magnetic structures, which provides a North to South and a South to North magnetic transition to angular position sensor 28 as the rotating engine component 40 is rotated through a complete rotation. While a variety of dipole magnets can be employed, some of which are described in more detail below, the simplest dipole magnet 36 is a bar magnet with a North magnetic pole at one end and a South magnetic pole at the other end.

In a present embodiment of the invention, the inventors have used the model 2SA-10 Sentron sensor manufactured by Sentron AG, Baarerstrasse 73, 6300 Zug, Switzerland. Each of the sinusoid signals from sensor 28 is provided to processor 24 which performs a CORDIC (COordinate Rotation DIgital Computer) algorithm to determine the arctan of the two sinusoids, thus determining the angular position of dipole magnet 36, and thus the engine component 40.

Specifically, as sensor 28 measures the angular position of a rotating component 40, such as a camshaft, etc., sensor 28 outputs a pair ($V_1$, $V_2$) of sinusoidal output voltages that are ninety degrees out of phase. The angular position $\alpha$ of the rotating component 40 can be determined by processor 24 from:

$$V_1 = \cos(\alpha)$$

$$V_2 = \sin(\alpha)$$

$$\frac{V_2}{V_1} = \frac{\sin(\alpha)}{\cos(\alpha)} = \tan(\alpha)$$

$$\alpha = \arctan\left(\frac{V_2}{V_1}\right)$$

where

For ($V_1$>0, $V_2$>0), $\alpha$=arctan($V_2/V_1$);

For ($V_1$=0, $V_2$>0), $\alpha$=90°;

For ($V_1$<0), $\alpha$=180°+arctan($V_2/V_1$);

For ($V_1$=0, $V_2$<0), $\alpha$=270°; and

For ($V_1$>0, $V_2$<0), $\alpha$=360°+arctan($V_2/V_1$).

Using a CORDIC algorithm and a TMS320F2810 DSP processor, manufactured by Texas Instruments, to process the sinusoid signals, and with static calibration of the sensor circuitry and dynamic calibration, implemented in the DSP, the present inventors have obtained angular position accuracy of two degrees at rotational speeds ranging from zero RPM to as high as twenty-five thousand rpm.

By employing two sensor pairs 32 of oppositely orientated sensors, angular position sensor 28 does not measure absolute magnetic field strength, and instead measures the relative field strength at each sensor pair 32, and sensor 28 operates independent of variations in the magnetic field strength of dipole magnet 36, provided only that sensor 28 receives a sufficient amount of magnetic flux from dipole magnet 36. Thus, the distance between sensor 28 and dipole magnet 36 is not critical, allowing for simplified manufacturing of engines using sensor 28 and dipole magnet 36.

Further, the configuration, construction and mounting of dipole magnet 36 is not particularly limited. For example, dipole magnet 36 can be a Rare Earth magnet, such as samarium cobalt (SmCo) or neodymium iron boron (NdFeB) to allow sensor 28 to operate with a relatively large clearance between dipole magnet 36 and sensor 28. If a smaller clearance between sensor 28 and magnet 36 on rotating member 40 can be tolerated, magnets which produce a lower flux density can also be employed.

Figure 2A:
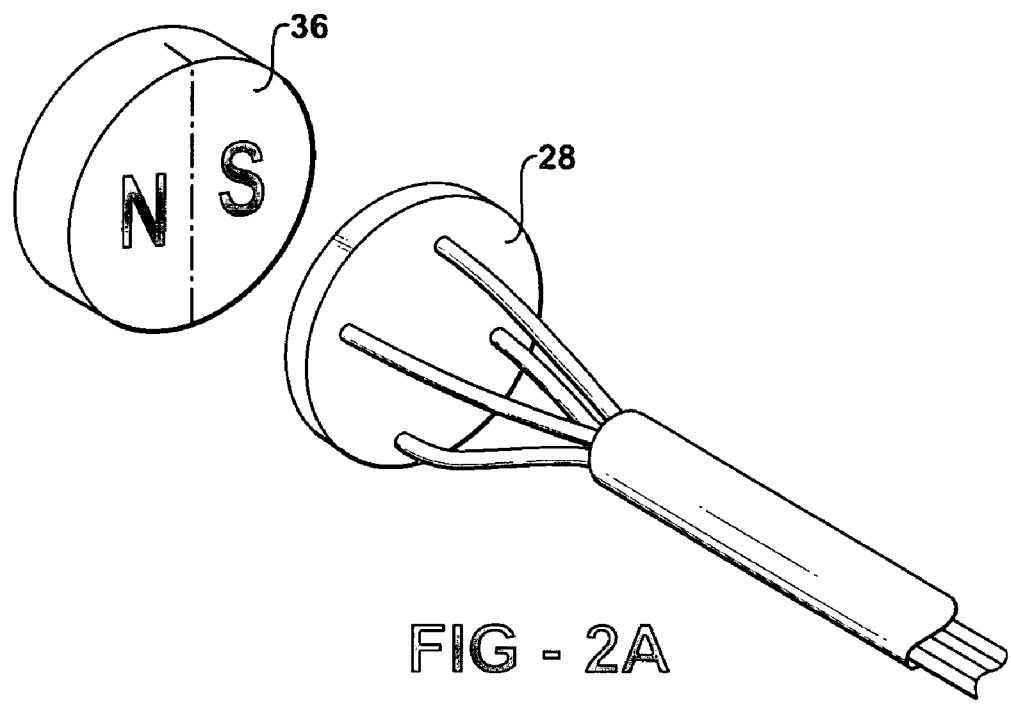
FIG. 2a shows a perspective view of a disc-shaped dipole magnet and an angular position sensor shown in FIG. 2.
Figure 2B:
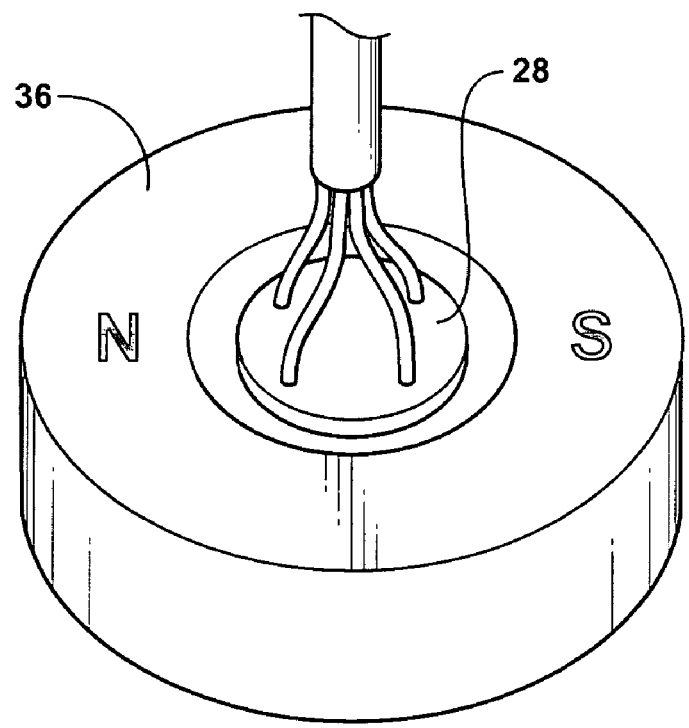
FIG. 2b shows a perspective view of a ring-shaped magnet and angular position sensor shown in FIG. 2.

Further, as mentioned above, dipole magnet 36 can be in a variety of configurations, including disc-shaped magnets (having a north-south pole interface extending across the face of the disc) as illustrated in FIG. 2*a*, a square-shaped magnet, similar to the disc of FIG. 2*a*, but square in plan view rather than round, a bar magnet with the north pole and one end at the south pole at the other, a ring magnet with a north and south pole located on opposite sides of the ring, as shown in FIG. 2*b*, etc.

As will be apparent, it is necessary to index the north to south/south to north transition of dipole magnet 36 to a known angular position of the rotating member of interest and this can be accomplished in a variety of manners. For example, dipole magnets 36 can be magnetized in a given orientation relative to an indexing feature, such as a groove or tab, on magnets 36 and rotating members 40 to which a dipole magnet 36 is to be attached can have a complementary indexing feature formed in it to ensure that the north to south/south to north transitions occur at a given, desired orientation with respect to rotating member 40.

Alternatively, once rotating member 40 has been installed in engine 100, the indexing can be performed within processor 24 by placing engine 100 in a specified orientation (e.g.—number one cylinder at TDC) and equating the outputs of sensors 28 with this known position.

In another embodiment, the engine component 40 itself can be magnetized to form the dipole magnet at at least its end. While this requires that engine component 40 be magentizable, by magnetizing the bulk mass of component 40 a magnetic field strength (flux density) approaching that which results from affixing a samarium cobalt magnet, or the like, to component 40 can be obtained.

Alternatively, a magnet "blank" can be attached to engine component 40 during its manufacture. Such a blank can comprise a mass of magnetizable material, such as the above-mentioned samarium cobalt or other materials, and as a step in the manufacture of engine component 40, the assembly of engine component 40 and the blank can be placed in a jig and magnetized. By magnetizing the blank after it is attached to engine component 40, indexing of the north to south/south to north transitions to a selected angular position of engine component 40 is easily accomplished.

It is preferred that, when rotating members 40 are formed of magnetic material, the dipole magnets 36 be mounted to rotating members 40 with an interface of non-magnet material between dipole magnet 36 and rotating member 40. This non-magnetic material can be a plastic or epoxy material used to mount dipole magnet 36 to rotating member 40 or can be a carrier of aluminum, stainless steel or other non-magnetic material which mounts dipole magnet 36 to rotating member 40. While, depending upon the structure, size and composition of dipole magnet 36, the present invention can operate when dipole magnet 36 is in direct magnetic contact with rotating members 40 formed of magnetic material, it has been found that stronger and/or better defined magnetic flux signals are provided to sensor 28 from a dipole magnet 36 on a rotating member 40 when the dipole magnet is separated from the rotating member 40 by an interface of non-magnetic material.

While it is presently preferred that angular position sensors 28 employ two sensor pairs 32 of oppositely orientated magnetic sensors, where each magnetic sensor pair 32 provides an output signal and this pair of signals is processed by processor 24 to determine the angular position of a rotating member, it is also contemplated that sensors 28 can employ a single pair 32 of magnetic sensors. Such sensors are available from a variety of manufacturers, including the KMZ41 sensor sold by Philips Semiconductor.

In such a case, the output of the magnetic sensor pair 32 will only indicate the angular position within a one hundred and eighty degree half circle that is repeated for a full revolution, but this can be combined with the output signal from another sensor, such as a conventional inductive sensor or the like, which indicates which of the two possible one hundred and eighty degree half circles the rotating member is in. In other words, a half-circle position sensor signal will indicate whether the rotating member is positioned in a first half circle between zero and one hundred and eighty degrees or in the second half circle between one hundred and eighty one degrees and three hundred and sixty degrees and the second position sensor will indicate where the member is positioned with those half circles. Processor 24 receives both signals and can output the position of the rotating member after the two signals have been appropriately processed.

While sensor 28 can comprise such a half-circle sensor and a position sensor, it is believed that the above-described dual magnet sensor pair configuration better serves the needs of most engine controller systems and such sensors are presently preferred for use in system 20.

Figure 3:
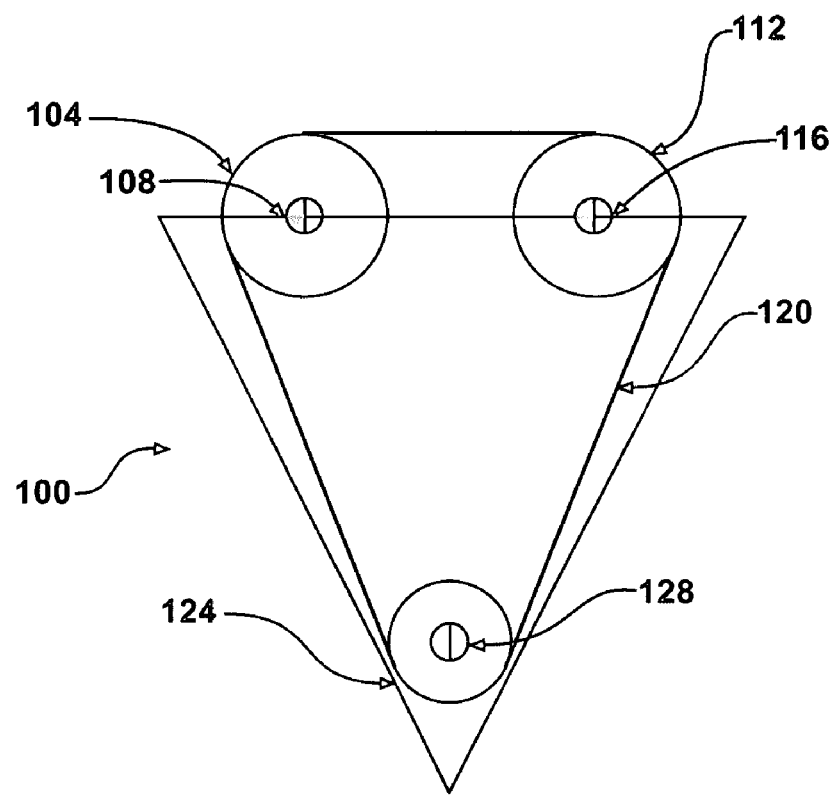
FIG. 3 shows a schematic representation of the front of an engine showing a dipole magnet attached to each of three rotating engine members.
Figure 4:
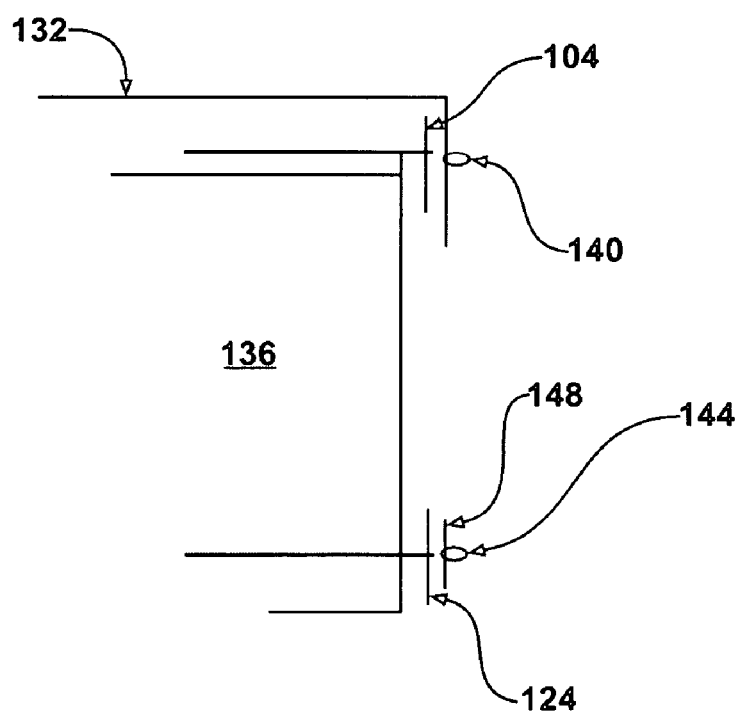
FIG. 4 shows a schematic representation of the side of the engine of FIG. 3 showing angular position sensors to measure the magnetic field of the dipole magnets.
Figure 4A:
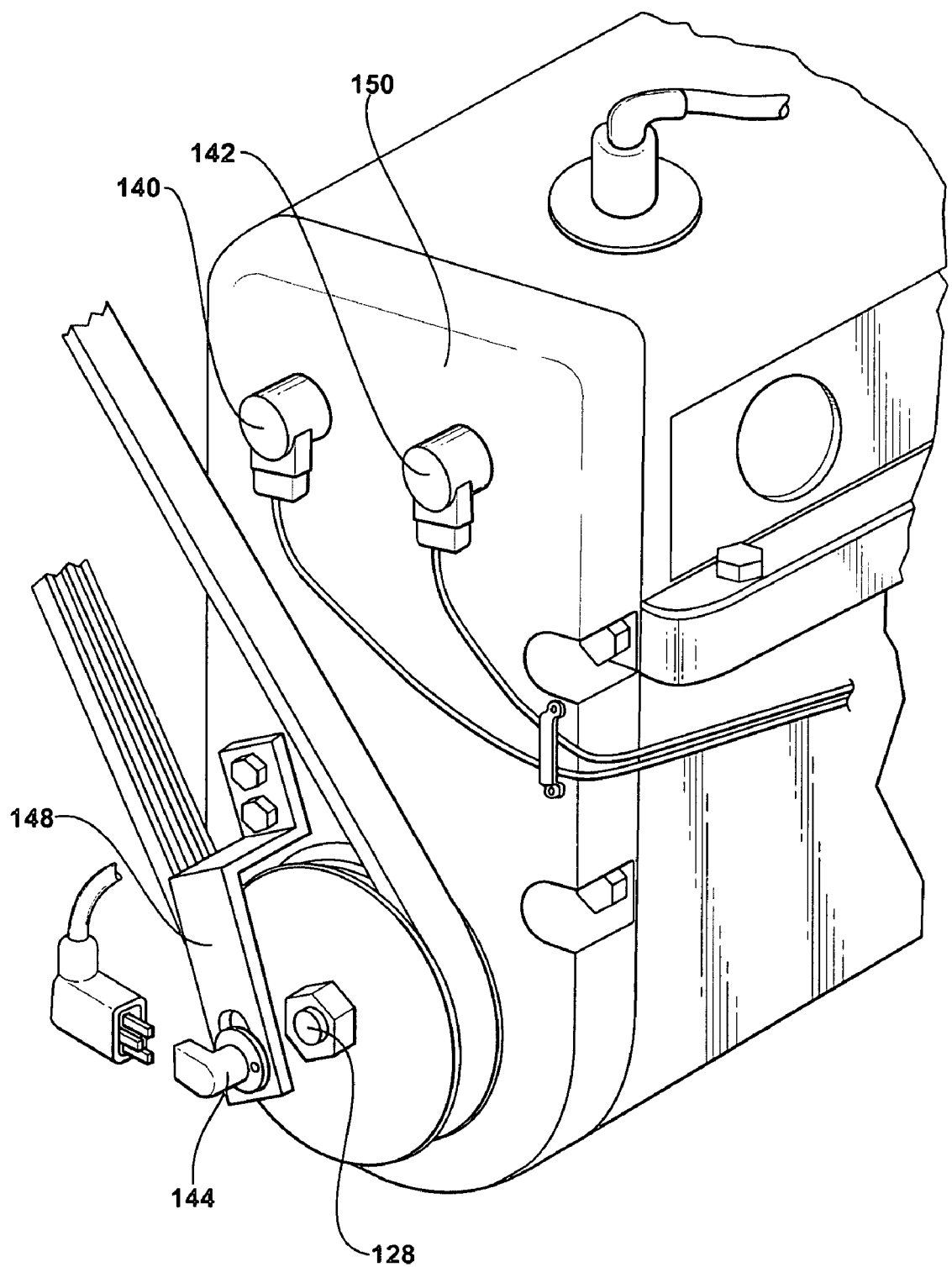
FIG. 4a shows a perspective view of the front of the engine of FIG. 3 wherein the camshaft angular sensors are mounted on the timing cover of the engine.

In a present embodiment of engine controller system 20, a double overhead cam engine 100 shown in FIGS. 3, 4 and 4*a* is controlled. In this engine, inlet camshaft 104 has a dipole magnet 108 mounted at its forward end and exhaust camshaft 112 also has a dipole magnet 116 mounted at its forward end. In this example, each of dipole magnets 108 and 116 are disc-shaped samarium cobalt magnets which are affixed to the end of their respective camshafts with the north south pole interface line crossing the axis of rotation of the respective camshafts.

Camshafts 104 and 112 are connected, via a synchronous drive 120, such as a timing belt or chain, to a timing sprocket on engine crankshaft 124 which, in this embodiment, also has a dipole magnet 128 affixed to its end. As with dipole magnets 108 and 116, dipole magnet 128 is preferably a samarium cobalt magnet which is, in this case, affixed to the head of the bolt retaining the timing sprocket to crankshaft 124. As will be apparent to those skilled in the art, preferably dipole magnet 128 is affixed to the bolt retaining the timing sprocket to crankshaft 124 via an non-magnetic interface, such as a stainless steel or aluminum interface piece, or the bolt itself is fabricated from non-magnetic material such as stainless steel. By providing such a non-magnetic interface between dipole magnet 128 and the bolt, a magnetic field which is stronger and better-formed is produced by dipole magnet 128.

As best seen in FIG. 4, a rocker cover 132 is mounted to engine block 136 and an inlet camshaft sensor 140, of the form of sensor 28, is mounted to rocker cover 132 as is the exhaust camshaft sensor (not shown in this Figure). One perceived advantage of the present invention is that sensor 28 can be separated from the dipole magnet it is measuring by a relatively large distance, in excess of 15 mm depending upon the type and configuration of dipole magnet 36, provided that this distance is relatively constant, and other, non-magnetic materials can be interposed between the sensor and the dipole magnet while allowing the sensor to still function. For example, sensors 28 can be on one side of structures made of aluminum, plastic and stainless steel, to name a few, with the dipole magnet on the other of the structure and sensor 28 can still operate. Thus, requirements for sealing sensors 28 such as to prevent contaminants from entering engine 100, or to prevent pressurized gases, either inlet gases or exhaust gasses, from leaving engine 100 can be avoided. As will be apparent to those of skill in the art, a variety of other mounting configurations can be employed, including mounting sensor 140 in a bore cast in rocker cover 132, etc.

In the embodiment shown in FIG. 4, camshaft sensor 140 is mounted to rocker cover 132. While not illustrated in FIG. 4, a sensor of the form of sensor 28 is also mounted to rocker cover 132 adjacent dipole magnet 116 on exhaust camshaft 112. A sensor 144, in the form of sensor 28, is mounted on a bracket 148, adjacent dipole magnet 128 on crankshaft 124.

FIG. 4a shows a similar embodiment of engine 100 wherein inlet camshaft sensor 140 and exhaust camshaft sensor 142 are mounted on a timing cover 150, which can be fabricated from plastic or metal. FIG. 4a also shows dipole magnet 128, sensor 144 and bracket 148 in more detail.

Figure 4B:
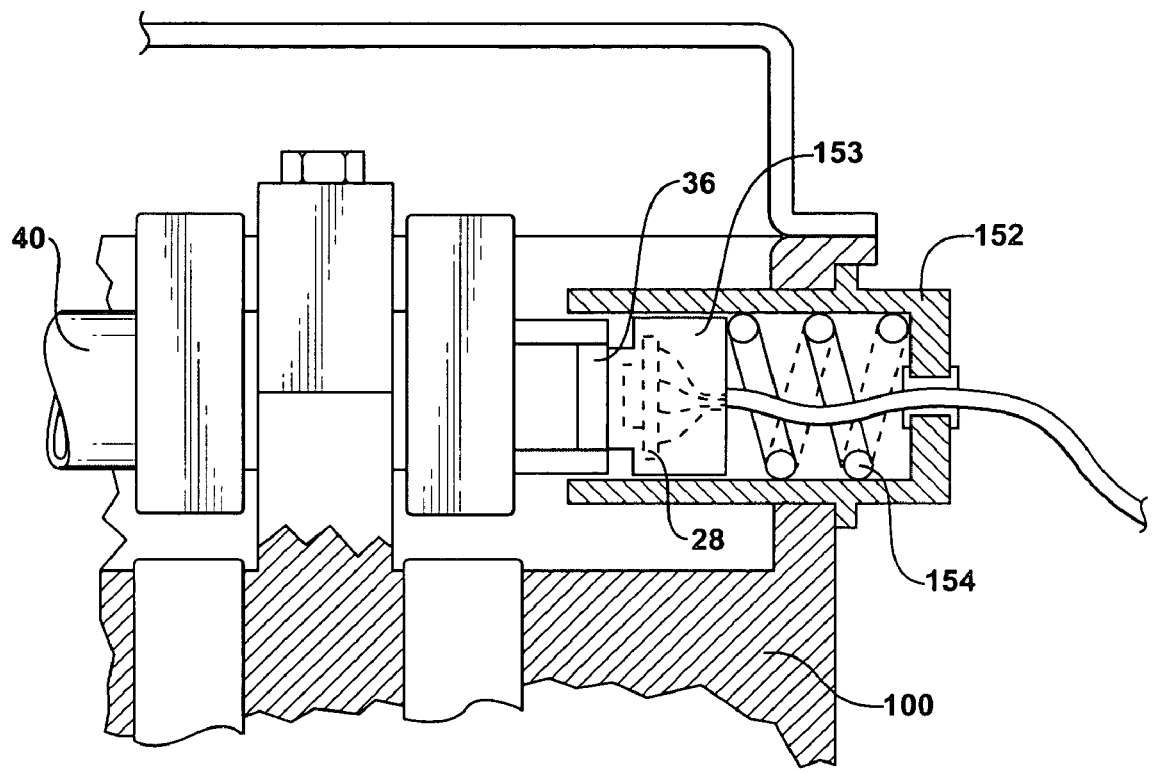
FIGS. 4b, 4c and 4d show embodiments of sensor mounts to mount the angular sensors of FIG. 4 to an engine.

FIG. 4b shows one embodiment of a sensor mount 152 for mounting sensor 28 to an engine 100 for measuring the angular position of a rotating member 40. In the illustrated embodiment, sensor mount 152 is mounted to the back side of engine 100, the timing gears and synchronous drive being located at the front side of engine 100. Sensor mount 152 includes a sensor carrier 153 in which sensor 28 is mounted. Sensor carrier 153 can be fabricated in any suitable manner of any suitable material, such as by injection molding of Delrin™, etc. and sensor carrier 153 is biased by a spring 154 into contact with the end of rotating member 40 to bring sensor 28 into an appropriate range of dipole magnet 36 and to substantially align sensor 28 with dipole magnet 36. Spring 154 and sensor carrier 153 provide tolerance for any end float in rotating member 40 as sensor carrier 153 will move with, and remain in contact with, the end of rotating member 40. As will be apparent to those of skill in the art, sensor carrier 153 is prevented from rotation within sensor mount 152 to prevent measurement errors which would occur from any rotation of sensor 28. Accordingly, sensor carrier 153 can be square in cross section, or otherwise indexed in an appropriate manner, to prevent such undesired rotation of sensor 28.

Figure 4C:
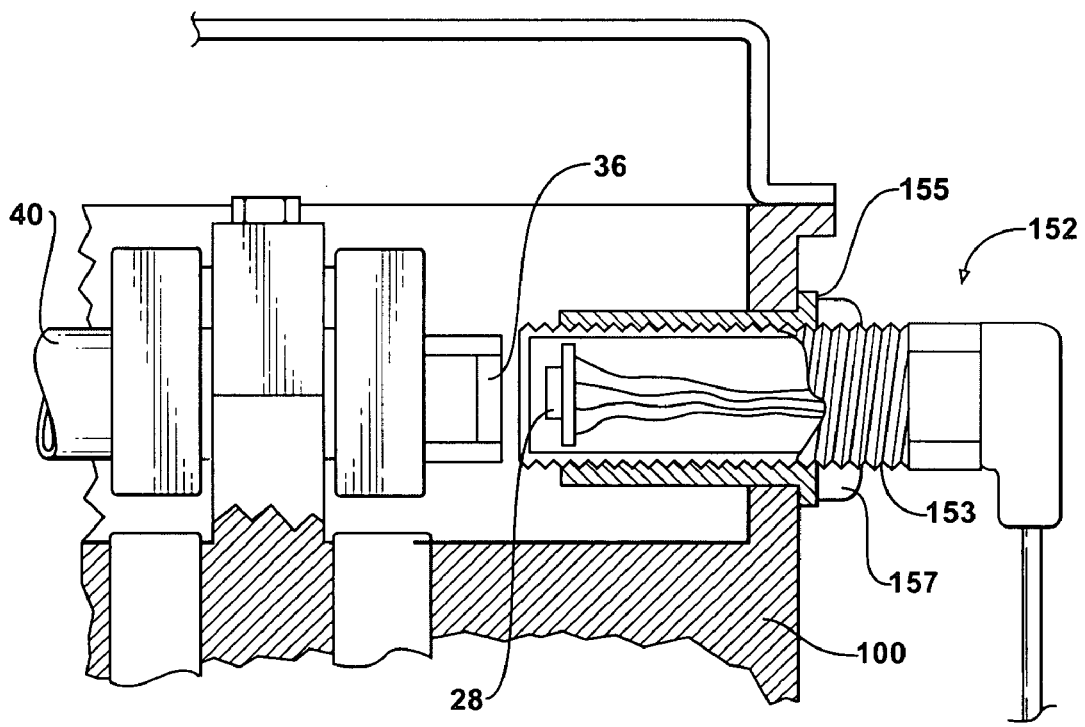

FIG. 4c shows another embodiment of sensor mount 152 which includes a main body 155 with a threaded bore to receive sensor carrier 153, whose exterior is also threaded. In this embodiment, which is intended for use with rotating members 40 subject to little end float, sensor carrier 153 is screwed into or out of the bore in main body 155 to establish a desired clearance between dipole magnet 36 and sensor 28 and is then locked in place with an appropriate mechanism, such as the illustrated lock nut 157, or a locking epoxy, etc.

Figure 4D:
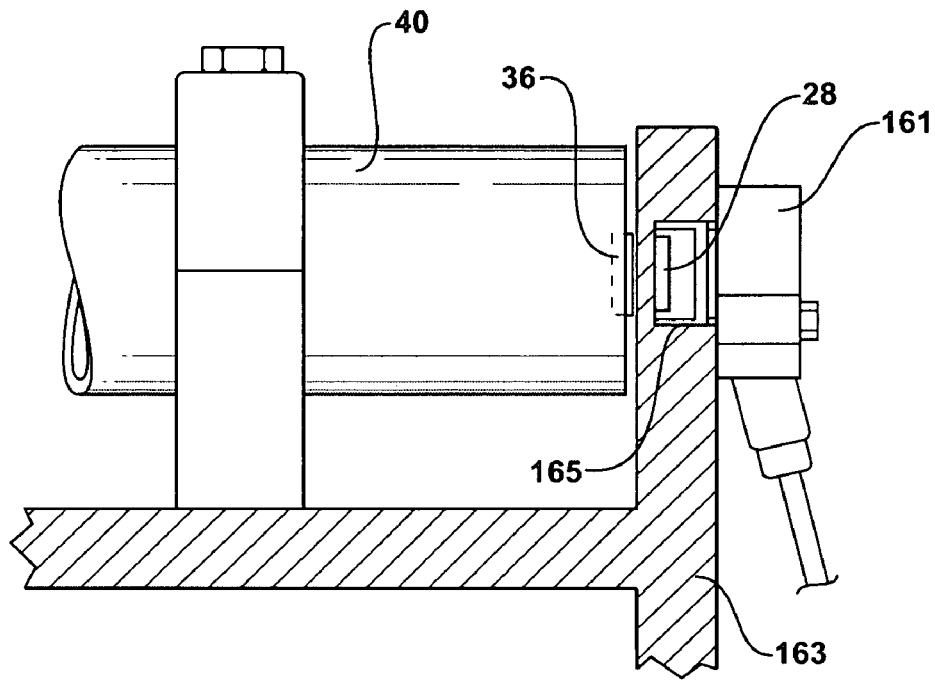

FIG. 4d shows a sensor mount 161 which is intended to be mounted on a non-magnetic surface 163, such as an aluminum or plastic timing cover. In this embodiment, a non-through bore 165 is formed in non-magnetic surface 163 and sensor mount 161 includes a portion in which sensor 28 is located which is inserted into bore 165 to bring sensor 28 within a desired operating distance from dipole magnet 36. As will be apparent, with sensor mount 161 no sealing member is required to isolate the interior volume within surface 163 as no through-bore is required in non magnetic surface 163.

Figure 5:
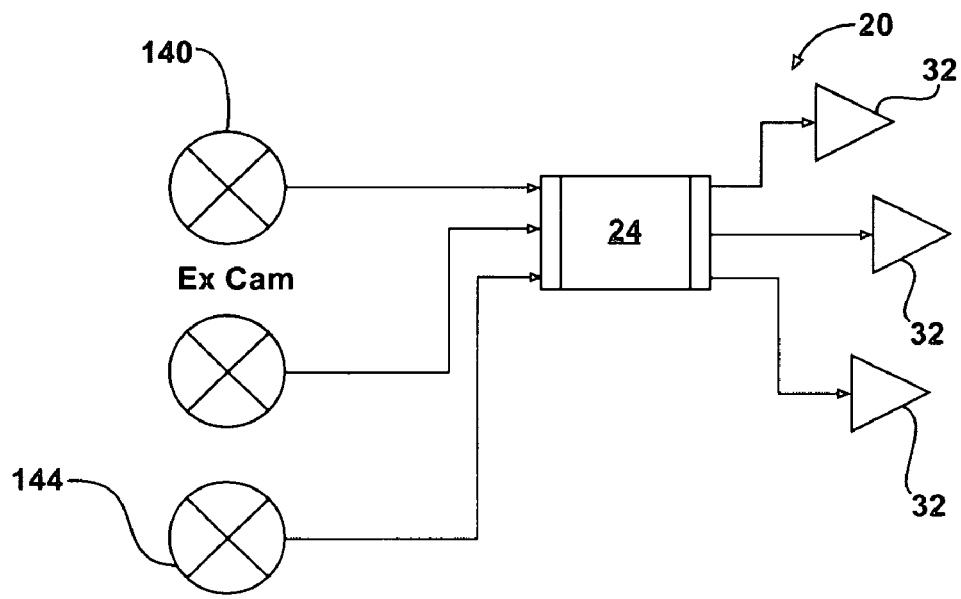
FIG. 5 shows a schematic representation of another engine controller system in accordance with the present invention.

As shown in FIG. 5, the signal from each of inlet camshaft position sensor 140, the exhaust camshaft sensor ("Ex Cam") and crankshaft sensor 144 are provided to processor unit 24 in system 20. When engine 100 is operating, processor unit 24 determines the angular position of each of inlet camshaft 104, exhaust camshaft 112 and crankshaft 124 and uses this information to control engine 100. With prior art engine controllers, it was typically deemed sufficient to determine the position of the crankshaft and then to estimate the relative positions of inlet and exhaust camshafts from the crankshaft. However, such estimated positions ignore the effects of torsional vibrations in synchronous drive 120 and other factors which can lead to differences between the actual positions of the inlet and exhaust camshafts and their estimated positions. It has been found that these differences in prior art engine controllers can lead to errors in fuel injection, ignition control and/or other engine control functions that are dependent upon the accuracy of this information.

With the present invention and with careful assembly and calibration, processor 24 can determine the position of the crankshaft and the inlet and exhaust camshafts to one degree, or better, of accuracy and thus processor 24 can produce output signals 32 to fuel injection, ignition systems (in gasoline engines) and other engine subsystems allowing for better combustion of fuel, with a commensurate increase in the efficiency of engine 100 and decrease in emissions.

If engine 100 employs a variable valve timing (VVT) system and/or variable valve lift (VVL) system, additional advantages in the operation of engine 100 can be achieved with the present invention. In such systems, prior art engine controllers have estimated the position of each of the inlet and outlet camshafts, achieving no better than an eight to ten degree level of accuracy. Thus, prior art engine controllers have been unable to exploit much of the potential advantage of VVT and/or VVL systems. With the present invention, angular positions of the crankshaft and camshafts and other rotating components and subsystems of engine 100 can be determined with high accuracy, for example within one degree of accuracy, allowing for improved control and operation of VVT and VVL systems.

In addition to the advantages mentioned above, an engine controller system 20 in accordance with the present invention can also determine torsional deflections (i.e.—twist) in rotating members in engine 100 and account for such deflections when producing control signals 32. Specifically, rotating members in engine 100, such as camshafts and the crankshaft are subject to torsional deflections due to load being irregularly applied to them. For example, the angular position of the front of a crankshaft may be several degrees ahead of the angular position of the rear of the crankshaft due to the load, from the transmission, on the engine when the transmission is in gear while the angular position of the front of the crankshaft and the rear of the crankshaft will agree much more closely when the transmission in neutral, reducing the load. Similarly, camshafts suffer from torsional deflections as they open and close valves and/or as the engine experiences sudden load or operating speed changes. In prior art engine control systems, the engine controller ignored such deflections.

Figure 6:
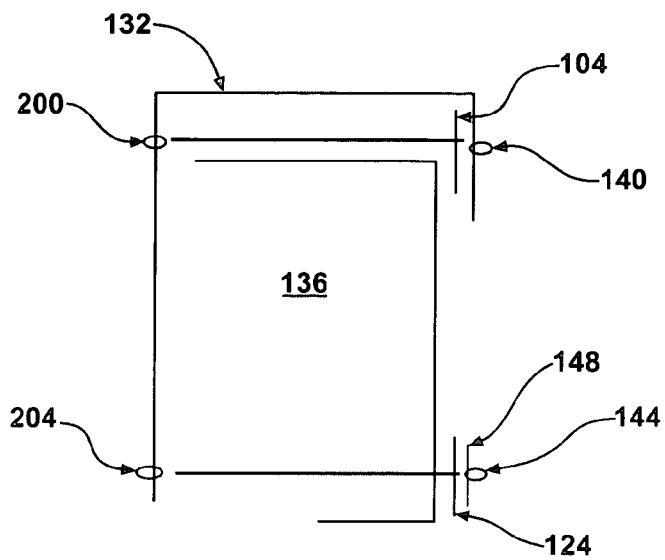
FIG. 6 shows a schematic representation of the side of the engine of FIG. 3 showing angular position sensors to measure the magnetic field of the dipole magnets located at each end of the rotating members.

In contrast, in engine control system 20, a dipole magnet and angular position sensor 28 can be located at each end of a rotating member, as shown in FIG. 6. In the Figure, inlet camshaft 104 has a dipole magnet 108 (not shown in this Figure) and position sensor 140 at its front end as before and, in this embodiment, inlet camshaft 104 has another dipole magnet (not shown) affixed to its back end and has a position sensor 200 mounted adjacent that dipole magnet in rocker cover 132. In a similar manner, but not shown in the Figure, exhaust camshaft 112 has its front dipole magnet 116 and front position sensor as before, but also has another dipole magnet affixed to its back end and a back position sensor is mounted in rocker cover 132 adjacent that dipole magnet. Crankshaft 124 also still has its front dipole magnet 128 and sensor 144 and now also has a second dipole magnet affixed to its back end and a back end sensor 204 mounted to an appropriate mount point adjacent the dipole magnet. Thus the angular position of the front and back end of any or all of the rotating components of engine 100 can be determined.

Figure 7:
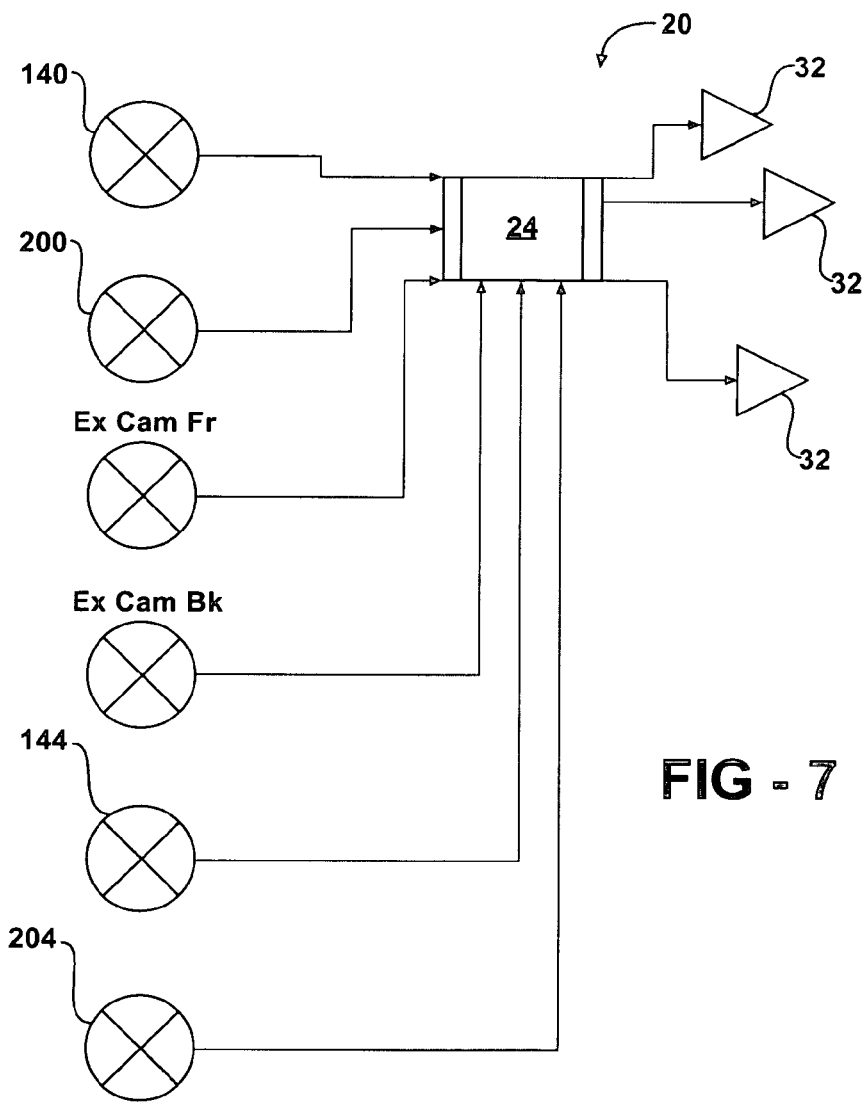
FIG. 7 shows a schematic representation of another engine controller system in accordance with the present invention.

As shown in FIG. 7, the output signals from each position sensor are applied to processor 24. By comparing the position sensor signals between the front and back of a camshaft, processor 24 can determine the current torsional deflection of the camshaft. If, for example, processor 24 determines that the back of inlet camshaft 104 is trailing the front end by two degrees at the point where cylinder number four (located at the back of engine 100) is to receive fuel, processor 24 can delay the control signal 32 to inject fuel into cylinder four for two degrees of rotation.

Also, by extrapolation, processor 24 can estimate that inlet cam 104 is trailing the front of the cam by one point five degrees for cylinder three, by one degree for cylinder two and by one half degree for cylinder one. Or, if torsional deflections of inlet camshaft 104 are not distributed linearly along its length, as can be determined empirically by the manufacturer, processor 24 can use a look up table or the like to determine the amount of deflection at each point of interest along the length of the camshaft. As will be apparent, similar determinations can be made for exhaust camshaft 112 and crankshaft 124.

It should be noted that such torsional deflections are not constant during operation of engine 100, and in fact are not necessarily constant during a rotation of engine 100 and thus processor 24 is operable to determine such deflections, as needed, in real time, or close to real time.

In addition to altering fuel injection parameters, valve timing and/or lift parameters and ignition parameters, processor 24 can also utilize the torsional deflection information for other purposes. For example, torsional deflection in crankshaft 124 can be used by processor 24 as an indication of the load on engine 100 and this can be used to alter transmission shift points and active suspension settings. Such information can also be used to limit operation of engine 100, for example interrupting ignition timing to prevent engine 100 from over-revving, or from being over stressed.

Figure 8:
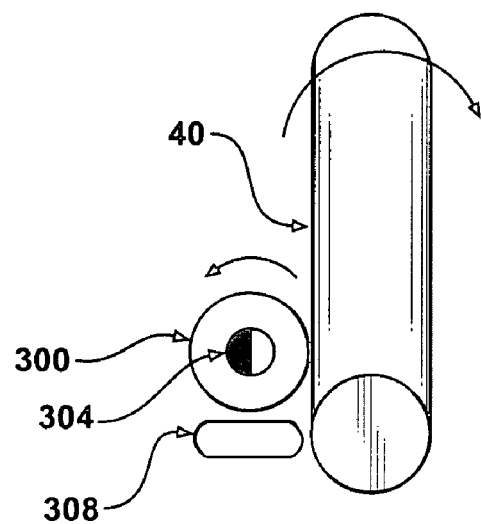
FIG. 8 shows a schematic representation of a drogue wheel dipole magnet for use with the present invention.

While the description above only describes placing the dipole magnet at the end of a rotating engine member, it is contemplated that in some circumstances it may be difficult or otherwise undesired to position the dipole in this configuration. For example, it can be difficult to locate a dipole magnet and sensor 28 at the flywheel end of a crankshaft. Accordingly, as illustrated in FIG. 8, it is also contemplated that in such circumstances a drogue wheel 300, or the like, can be employed to rotate with the rotating member 40 to be sensed, the dipole 304 being affixed to drogue wheel 300 and sensor 308, in the form of sensor 28, being located adjacent the drogue wheel. In this manner, an "offset" configuration of sensor 308 and dipole magnet 304 can be obtained. It is contemplated that such an offset configuration can also be employed to determine torsional deflections at points intermediate the ends of rotating members, if such accuracy in determining torsional deflection along the rotating member is required.

In other cases, where it may be difficult to locate a dipole magnet and sensor 28 for a rotating member, the angular position of the rotating member, such as a crankshaft, etc., can be determined from a device or subsystem driven by the rotating member. For example, an oil pump or jackshaft for engine 100 can be gear or chain driven by the crankshaft and the oil pump or jackshaft can be equipped with a dipole magnet and a sensor 28 and processor 24 can process the signal from this sensor to determine the position of the crankshaft without the necessity for mounting a dipole on the crankshaft and locating the corresponding sensor adjacent the dipole on the crankshaft.

In cases where a driven device is used to determine the angular position of a rotating member that drives the device, if the driven device rotates at a different rate than the crankshaft or other rotating member whose positions to be determined (e.g.—if the oil pump is rotated at half the rate of the crankshaft), processor 24 can appropriately process the signal from the sensor 28 to obtain a correct angular position result. In such cases processor 24 may require an additional input, such as a conventional inductive-type sensor or the output of another sensor 28 measuring the angular position of another rotating component (such as a camshaft) of engine 100 to determine which half, quadrant, etc. of a full three hundred and sixty degree revolution the driving member is in. If the driven member is driven at half the rate of the driving member, then a determination must be made of which one hundred and eighty degree half of a full revolution the driving member is in, if the driven member is driven at one quarter of the speed of the driving member, then a determination must be made of which ninety degree quadrant of a full revolution the driving member is in, etc.

Figure 9:
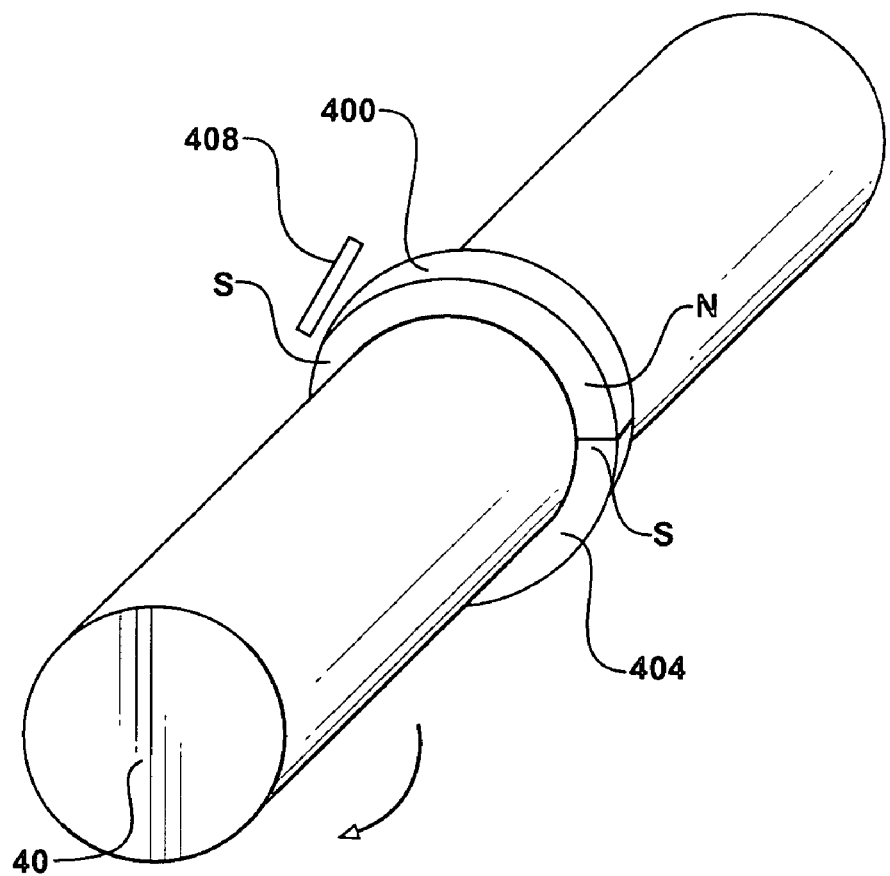
FIG. 9 shows an annular arrangement of dipole magnets about a rotating member, for use with the present invention.

FIG. 9 shows another dipole magnet configuration in accordance with an embodiment of the present invention. As mentioned above, a dipole magnet for use with the present invention can comprise a structure of several dipole magnets in an appropriate arrangement. In the embodiment illustrated in FIG. 9, at least one pair of dipole magnets 400, 404 are affixed about the perimeter of a rotating member 40, with the North pole "N" of dipole 400 adjacent the South pole "S" of dipole 404 and the North pole (not shown) of dipole 404 adjacent the South pole "S" of dipole 400. Sensor 408, in the form of sensor 28, is mounted beside the outer periphery of dipole magnets 400 and 404 and can detect the north-to-south and south-to-north field strength changes as member 40 rotates. Again, processor 24 will appropriately process the output of sensor 408 to compensate for the two north to south pole or south to north pole transitions that will occur during one complete revolution of rotating member 40.

Figure 10A:
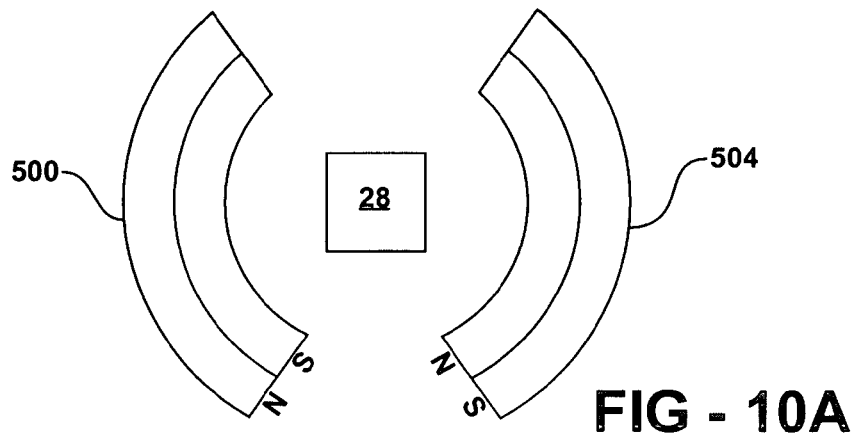

FIGS. 10A through 10E show various other configurations, other than the disc magnet, ring magnets and bar magnet discussed above, by which a suitable dipole magnet 36 for use with the present invention can be achieved. In FIG. 10a two pairs of magnets 500, 504 are shown where each pair 500, 504 is shaped in an arc to form an open annular structure. As illustrated, in pair 500 each magnet has its poles reversed from the other magnet, as do the magnets in pair 504 and angular position sensor 28 is located substantially at the center of the open annulus. It is contemplated that magnet pairs 500 and 504 can be attached to the end of a rotating member by any suitable means, with the plane of the open annulus being orthogonal to the rotational axis of the rotating member.

Figure 10B:
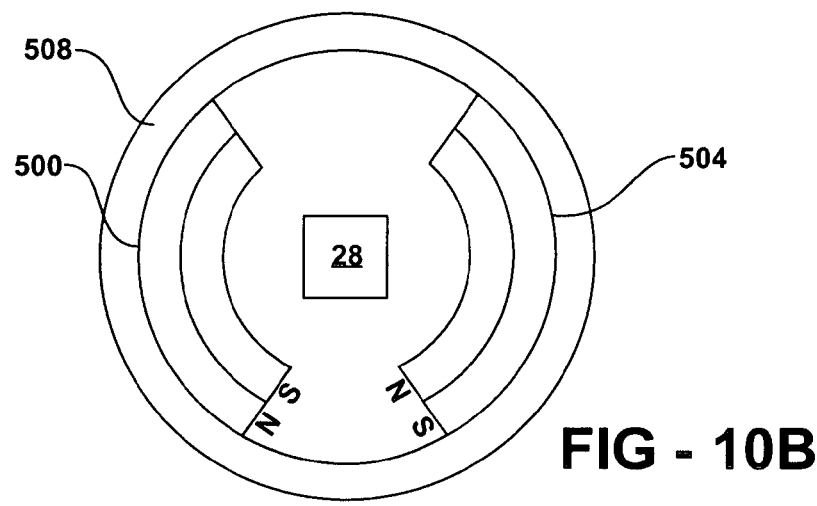

Another annular structure for a dipole magnet, similar to that shown in FIG. 10A, is shown in FIG. 10B. In this structure, a flux ring 508 is added to the structure of FIG. 10A to enclose the annulus and to distribute the magnetic flux from magnet pairs 500 and 504 about the annulus, further, flux ring 508 can be mounted to the end of the rotating member which may be easier to accomplish than mounting magnet pairs 500 and 504 to the rotating member. As will be apparent to those of skill in the art, flux ring 508 can also include features, such as inward extending tabs, which concentrate and/or arrange the flux produced from magnet pairs 500 and 504 in angular positions of particular interest. For example, flux ring 508 can include such an inward facing tab adjacent the angular positions wherein a crankshaft will be in the TDC position for each of one or more cylinders of an engine.

Figure 10C:
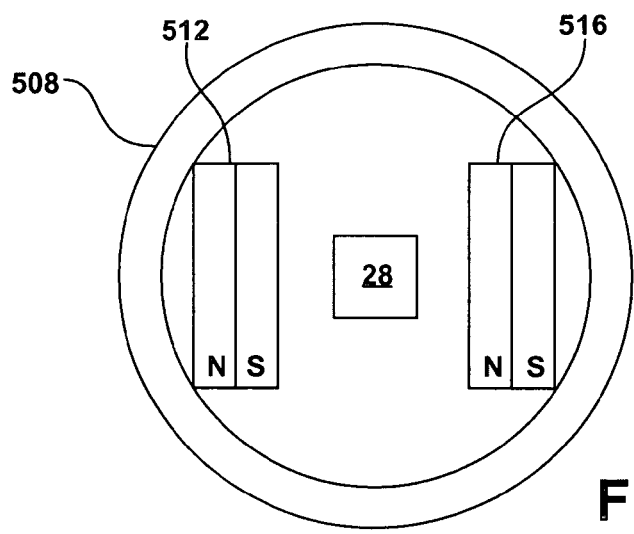

In the structure of FIG. 10C, the pairs 512 and 516 of magnets are bar magnets. In FIG. 10D, only one pair of magnets is employed, magnet 520 extending into flux ring 508 with its North pole extending outwardly and magnet 524 extending into flux ring 508 with its South pole extending outwardly.

FIG. 10E shows a magnet configuration comprising a ring magnet 550 which surrounds sensor 28. This configuration is believed to be particularly tolerant to any misalignment of the mounting of magnet 550 about the axis of rotation of the rotating member and/or any misalignment of sensor 28 with respect to the center of magnet 550 and/or the axis of rotation of the rotating member and/or movement of sensor 28 into or out of the plane of the ring of magnet 550. If desired, magnet 550 can be a Halbach magnet wherein the magnetic flux is better concentrated within the interior of the ring.

As will be apparent from the above, suitable dipole magnets for use in the present invention can be formed in a variety of manners, providing at least one North-to-South pole transition and at least one South-to-North transition for each full rotation of a rotating member. If more than one North-to-South and South-to-North transition is provided by the particular structure employed, processor 24 can be programmed to correctly identify the angular position of the rotating member in view of the multiple transitions and/or other inputs from conventional sensors or other sensors 28.

While it is presently preferred that system 20 employ sensors 28 such that no contact is required between sensor 28 and rotating member 40, it is contemplated that in some circumstances it can be desired or required to have sensors 28 directly or indirectly connected to a rotating member 40.

Figure 11:
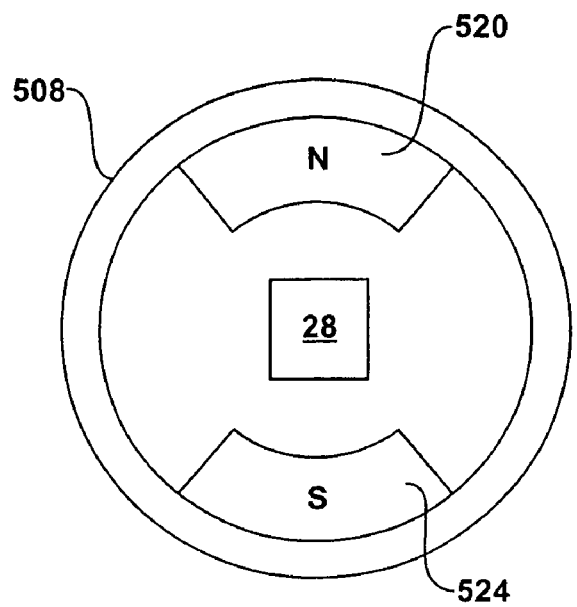
FIG. 11 shows an embodiment of a sensor assembly employed where a physical connection is desired between an angular sensor and a rotating member.
Figure 11:
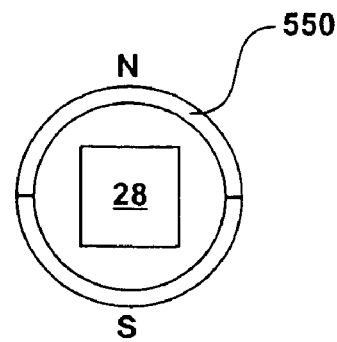
Figure 11:
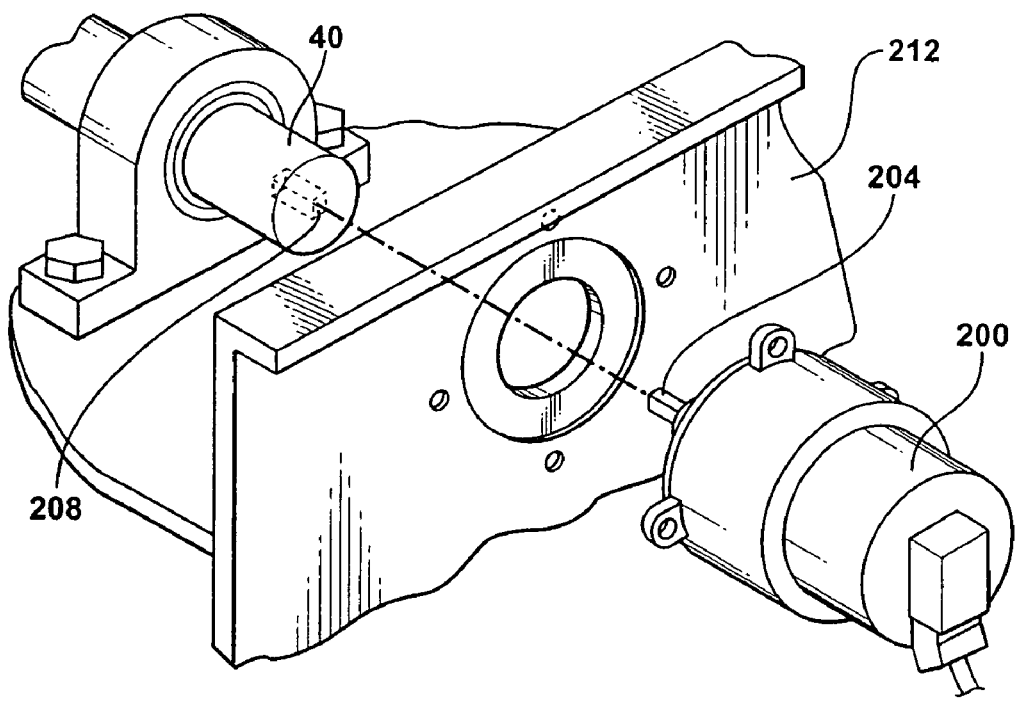

FIG. 11 shows a sensor assembly 200 which can be attached, via a shaft 204, to a rotating member 40 whose angular position is to be measured. In the particular embodiment illustrated in the Figure, rotating member 40 is a camshaft which includes a keyway 208 in its end, the keyway being complementary in shape to the shape of shaft 204. Sensor assembly 200 is mounted to timing cover 212 with shaft 204 engaging keyway 208 such that shaft 204 rotates with rotating member 40. Although not illustrated, preferably the complementary shapes of keyway 208 and shaft 204 are selected such that shaft 204 can only be received in keyway 208 in one orientation to index sensor assembly 200 to rotating member 40 (i.e.—sensor 28 in sensor assembly 200 indicates an angular position of zero degrees when rotating member 40 is in a selected position of interest) during assembly. Preferably, shaft 204 is slidably received in keyway 208 such that movement, such as float of a camshaft, toward or away from sensor assembly 200 can be accommodated.

Figure 12A:
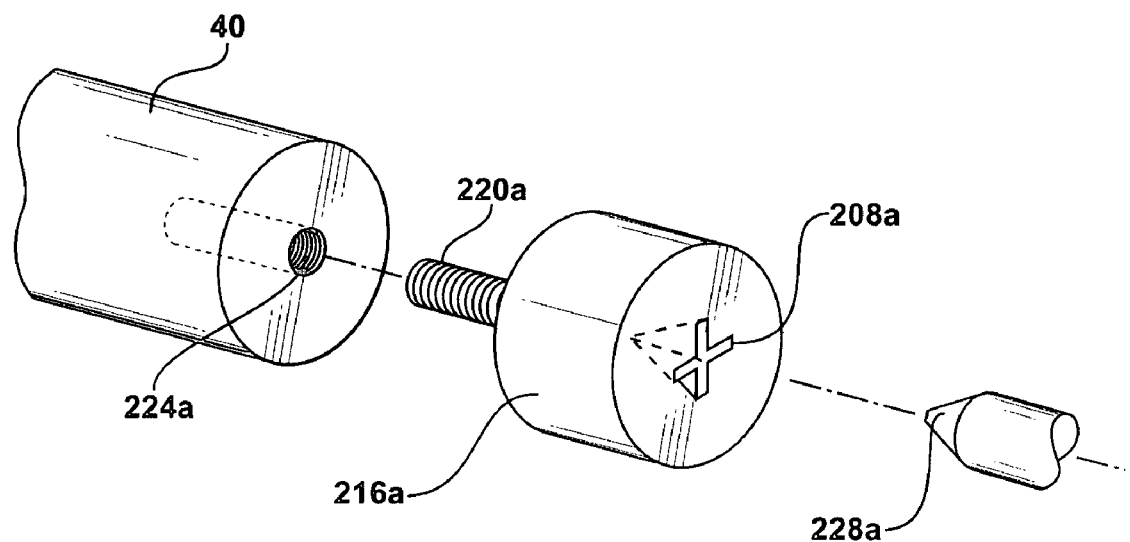
FIGS. 12a and 12b show additional embodiments of the attachment of a sensor assembly and a rotating member.
Figure 12B:
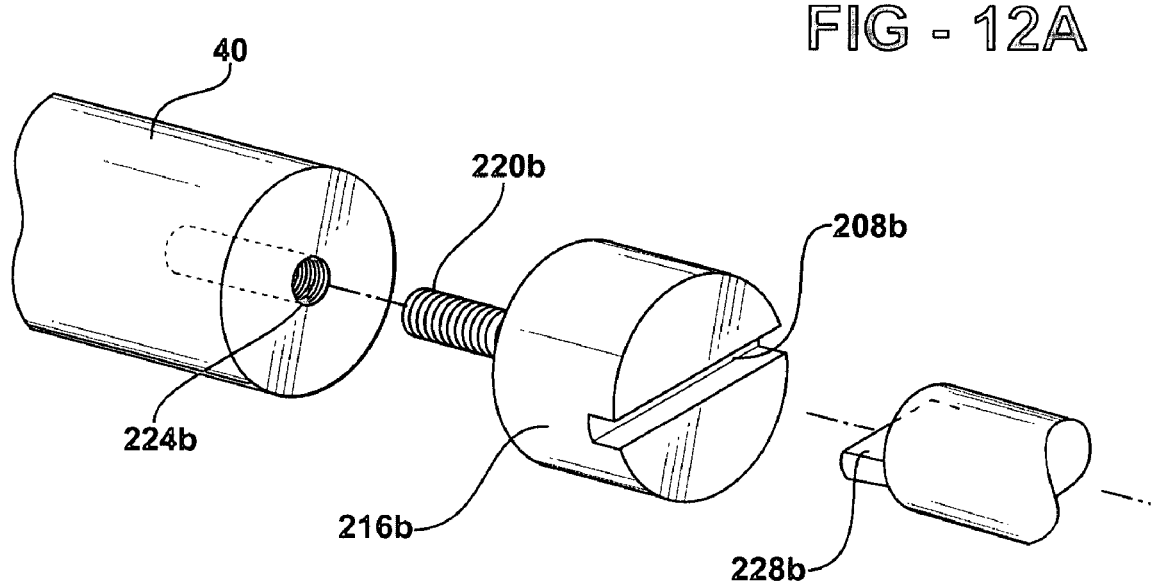

FIGS. 12a and 12b show examples of two of the many other methods which can be used to physically connect sensor assembly 200 to a rotating member 40. In the two illustrated embodiments, keyways 208a, 208b are formed in an intermediate member 216a, 216b which includes a threaded portion 220a, 220b which can be received in a threaded end bore 224a, 224b in rotating member 40. Intermediate members 216a, 216b can be employed with a locking feature, such as a lock nut or epoxy, to provide an indexing function to fix the north to south/south to north transition of dipole magnet 36 with respect to the angular position of rotating member 40. The end 228a, 228b of shaft 204 includes a feature which is complementary to the respective keyway 208a, 208b. As the torque which must be transmitted from rotating member 40 to sensor assembly 200 is very small, intermediate member 216 can be fabricated from a resilient material to compensate for assembly tolerances and minor misalignments, etc.

Figure 13:
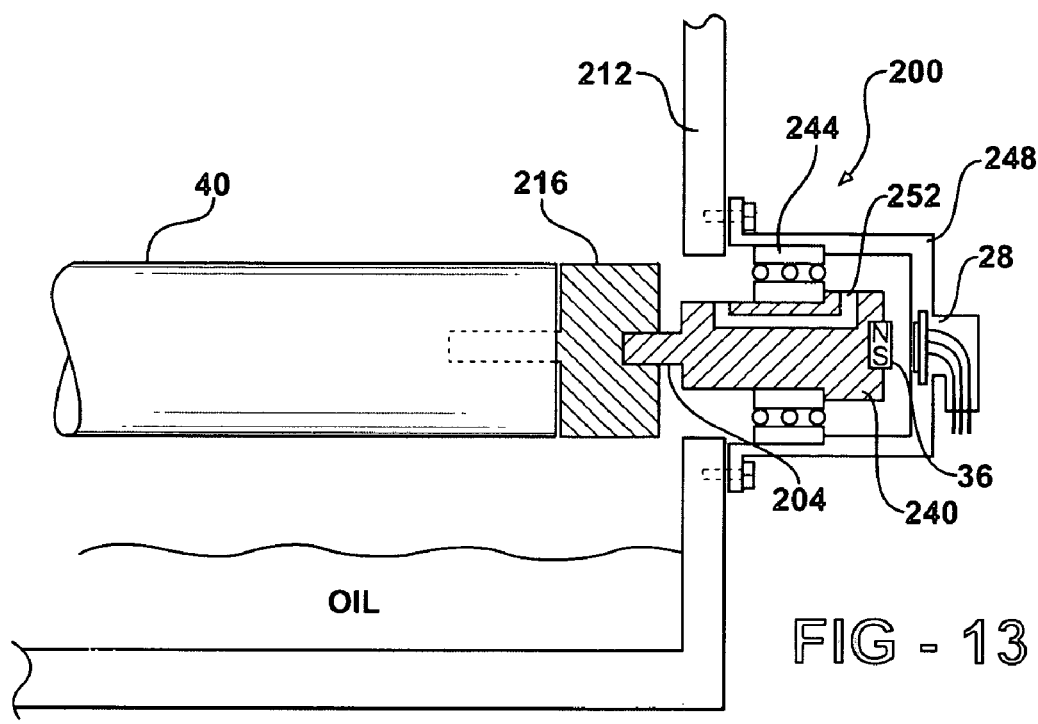
FIG. 13 shows a cross sectional view of the sensor assembly of FIG. 11 installed with the attachment method of FIG. 12b.

FIG. 13 shows a cross section of one embodiment of sensor assembly 200 physically connected to rotating member 40. As shown, a dipole magnet 36 is mounted at one end of a magnet carrier 240 and shaft 204 extends from the opposite end. Magnet carrier 240 is rotatably mounted via a suitable bearing 244, such as a roller bearing, within the housing 248 of sensor assembly 200. Sensor 28 is mounted within housing 248 substantially co-axially aligned with the axis of rotation of dipole magnet 36 which rotates with magnet carrier 240, shaft 204 and rotating member 40. If required, a pressure equalization passage 252 can be provided in magnet carrier 240 to equalize pressures, such as oil pressure, on either side of bearing 244.

As will be apparent, sensor assembly 200 can be pre-assembled to ensure alignment of the axis of rotation of dipole magnet 36 with the axis of sensor 28 and pre-assembled sensor assembly 200 can then be quickly and easily installed as a step of an engine assembly process.

While dipole magnet 36 is illustrated in FIG. 13 as being a planar magnet (disc, square, etc.), it should be apparent to those of skill in the art that many other arrangements of dipole magnet 36 and sensor 28 can also be employed, including dipole magnets 36 in the form of ring magnets, etc. as described elsewhere herein.

Figure 14:
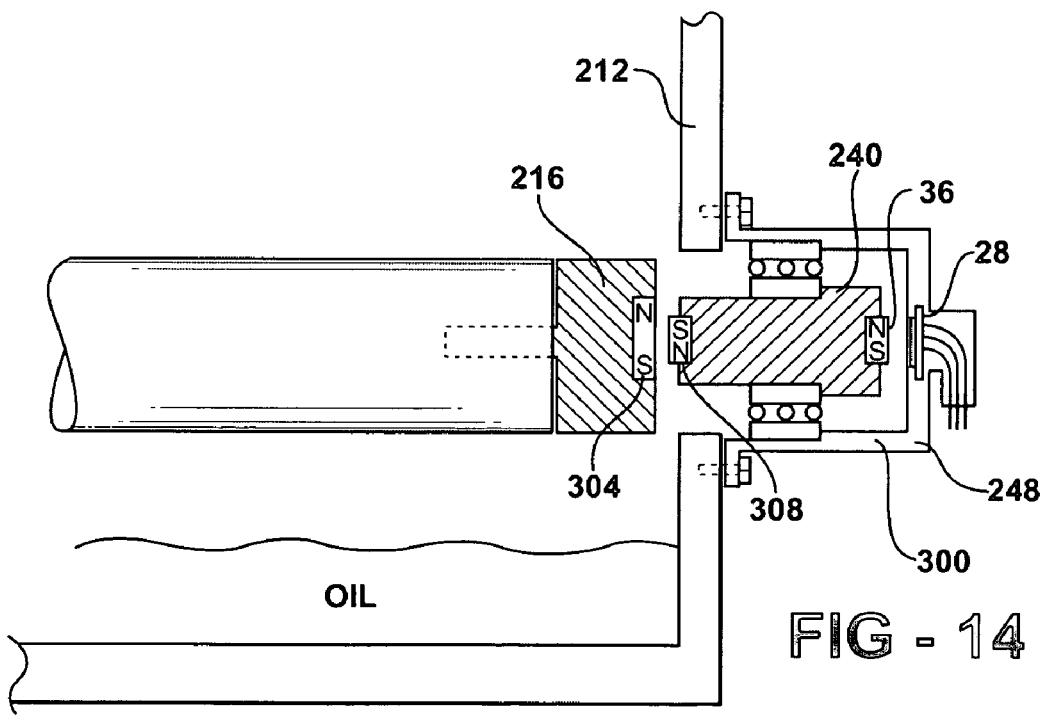
FIG. 14 shows a cross sectional view of another sensor assembly connected to a rotating member by a magnetic linkage.

FIG. 14 shows another embodiment of a sensor assembly 300 which can be pre-assembled and easily installed on a timing cover 212 or other part of an engine. In this embodiment, rotating member 40 has an intermediate member 216 which has a magnet 304 mounted to its face distal rotating member 40. Similar to sensor assembly 200, sensor assembly 300 includes a magnet carrier 240 which is rotatably mounted in sensor housing 248 via a bearing 244. Further, magnet carrier 240 includes a dipole magnet 36 on its face distal rotating member 40 and a sensor 28 is mounted to housing 248 opposite dipole magnet 36.

However, unlike sensor assembly 200, in sensor assembly 300 magnet carrier 240 includes a magnet 308 on the face opposite dipole magnet 36 and magnets 308 and 304 form a magnetic linkage through timing over 212 such that magnet carrier 240 rotates with intermediate member 216 and rotating member 40. As will be apparent t those of skill in the art, magnets 304 and 308 can be any configuration of magnets suitable for establishing a magnetic linkage between intermediate member 216 and magnet carrier 240. In particular, magnets 304 and 308 need not be dipole magnets. As will also be apparent to those of skill in the art, timing cover 212, or other engine component surface to which sensor assembly 300 is mounted, can include an aperture through which magnet carrier 240 can extend to achieve closer spacing between magnets 304 and 308.

While in the embodiments described above sensors 28 are shown as providing their output signals via a wiring harness, the present invention is not so limited and the output of sensors 28 can be provided to processor 24 via automotive data busses, wireless (RF) signals or via fiber optic cable.

Further, while in the embodiments illustrated herein processor 24 is shown separate from sensor 28, it is contemplated by the present inventors that sensors 28 can be formed in integrated sensor units which include A/D converters, a suitable processor and outputs such that these integrated sensor units will directly output a signal representing the angular position of the rotating member they are measuring and/or a control signal to actuator 32.

Another perceived advantage of the present invention is that sensors in the form of sensor 28 are absolute position sensors and will provide a angular position signal even if the rotating member they are sensing is not moving and/or they are first activated. In contrast, the prior art inductive pick up tooth sensing sensors and the like do not provide any indication of rotational speed or position unless the member they are sensing is moving and, further, as they are relative sensors, they cannot provide a meaningful signal until the member they are sensing has undergone some amount of rotation.

As will be apparent, engine controller system 20 offers many advantages over prior art engine controllers. More accurate control of fuel injection, valve timing, ignition (for gasoline engines) and engine load determinations can be obtained with engine control system 20. Further, the simplicity and ease with which angular position sensors, in the form of sensor 28, can be employed simplifies the design and construction of engines employing engine controller system 20.

Further, the variety of configurations with which dipole magnets can be affixed to rotating members and the available tolerances in mounting sensors 28 allow for angular position sensors 28 to be easily accommodated on most engine designs. Further, as sensor 28 needs only measure the rotating magnetic flux produced by the dipole magnet, sensor 28 can be mounted outside a non-magnetic enclosure, adjacent the dipole magnet, and still operate, thus avoid the need for seals, gaskets, etc. between the rotating member and sensor 28.

While the embodiments of engine controller system 20 described above employ multiple angular position sensors 28, it should be apparent to those of skill in the art that many of the benefits of the present invention can be obtained with only one sensor 28. Also, engine controller system 20 can advantageously employ more angular position sensors 28, if desired. For example, an angular position sensor 28 can be used to determine the angular position of an accessory, such as an air conditioner compressor, fuel injector pump, or a super charger or turbocharger rotor, etc. and such positional information can be used by processor 24 to alter the operating conditions of the engine accordingly. In particular, it is contemplated that a turbo charger or supercharger compressor with adjustable pitch vanes can be advantageously operated by engine controller system 20 to optimize the rotor speed at specific RPMs to obtain improved and/or near-optimal efficiency.

It is further contemplated that processor 24 may not require angular position information for one or more rotating members of an engine at all times. In such a case, engine controller system 20 can multiplex the signals from some or all of angular position sensors 28 to reduce the computational capacity required at processor 24.

Many conventional sensing systems for rotation output a train of pulses which are processed to produce useful information, such as counting the number of pulses which occur within a specified time to determine an average rotational speed. It is contemplated that, if desired, processor 24 can also produce such pulse trains if required by a legacy device connected to processor 24. For example, processor 24 can have a lookup table which indicates, for each desired increment of rotation of member 40, the number of pulse which would be output by such a prior art system (e.g.—for each 1 degree, output six pulses) and processor 24 can output a pulse train having the desired number of pulses. Also, for prior art pulse-based speed signals, processor 24 can output a pulse train with the required number of pulses in the required time period.

Processor 24 can further convert its absolute angular position information into pulse trains in useful and/or novel manners. For example, processor 24 can output different numbers of pulses for the same amount of rotation at different angular points to mimic the signal the rotation of a non-circular element, such as a cam lobe, on member 40 would produce. Further, processor 40 can produce the pulse train only through a selected portion of the rotation of member 40—mimicking the rotation of a truncated shape on member 40. As will be apparent to those of skill in the art, a wide variety of other pulse train modifications and/or emulations can easily be provided by processor 40 as desired.

The present invention provides an engine controller system which employs angular position sensors operable to very accurately determine the position of rotating engine members. Information about the angular position of the engine members is used to alter operation of the engine for improved efficiency and/or reduced emissions from the engine. The angular position of the crankshaft and camshafts can be determined by affixing a dipole magnet to each of them such that the magnetic field of the magnet rotates with the rotating member and then placing a angular position sensor adjacent each rotating member to detect the rotation of each magnetic field. In another embodiment, the angular position of each end of at least one of the rotating members is determined to allow the processor to determine the torsional deflection of the member and the engine controller system is responsive to that determined deflection to further alter operation of the engine.

The above-described embodiments of the invention are intended to be examples of the present invention and alterations and modifications may be effected thereto, by those of skill in the art, without departing from the scope of the invention which is defined solely by the claims appended hereto.

We claim:

1. An engine controller system for an engine comprising:
    at least one processor; and
    at least one angular position sensor for association with a rotating engine component, said sensor being responsive to a magnetic field rotating with changes in the angular position of the rotating engine component, said magnetic field being indexed to a known angular position of the rotating engine component, the sensor providing a pair of signals to said processor indicating the angular position of the component and wherein the processor processes said signals to determine an absolute angular position of the rotating component within a three hundred and sixty degree complete rotation and produces at least one output control signal to alter operation of said engine.

2. The engine controller system of claim 1 wherein said signals from at least one angular position sensor vary in a sinusoidal manner as the engine component rotates, one of said pair of signals being ninety degrees out of phase from the other of said signals.

3. The engine controller system of claim 2 wherein the processor implements a CORDIC algorithm on the pair of sinusoidal signals to determine the absolute angular position of the rotating component.

4. The engine controller system of claim 1 including at least two angular position sensors, one of said at least two angular position sensors determining the angular position of the crankshaft of the engine and the other of said at least two angular position sensors determining the angular position of a camshaft of the engine.

5. The engine controller system of claim 4 wherein the output control signal alters the fuel injection parameters for the engine.

6. The engine controller system of claim 5 wherein the processor produces a second output control signal, the second control signal operable to alter the ignition parameters for the engine.

7. The engine controller system of claim 1 including at least two angular position sensors, one of said at least two angular position sensors determining the angular position of one camshaft of the engine and the other of said at least two angular position sensors determining the angular position of another camshaft of the engine.

8. The engine controller system of claim 7 wherein the output control signal alters the fuel injection parameters for the engine.

9. The engine controller system of claim 7 wherein the processor produces a second output control signal, the second output control signal being operable to alter the ignition parameters for the engine.

10. The engine controller system of claim 1 wherein the magnetic field is produced by a dipole magnet affixed adjacent an end of the rotating component substantially at the axis of rotation.

11. The engine controller system of claim 10 wherein the dipole magnet is in the form of a disc magnet affixed at the axis of rotation of the rotating component.

12. The engine controller system of claim 10 wherein the dipole magnet is in the form of a square magnet affixed at the axis of rotation of the rotating component.

13. The engine controller system of claim 10 wherein the magnetic field is produced by a dipole magnet affixed to a drogue wheel driven by the rotating component.

14. The engine controller system of claim 10 wherein the magnetic field is produced by an assembly of at least two magnets.

15. The engine controller system of claim 7 further comprising a third angular position sensor determining the angular position of the crankshaft of the engine.

16. The engine controller system of claim 15 wherein the output control signal alters the fuel injection parameters for the engine.

17. The engine controller system of claim 15 wherein the processor produces a second output control signal, the second output control signal being operable to alter the ignition parameters for the engine.

18. The engine controller system of claim 1 including at least two angular position sensors, one of said at least two angular position sensors determining the angular position of one end of the rotating member and the other of said at least two angular position sensors determining the angular position of the other end of the rotating member and wherein the processor determines and compares the angular position of each end of the rotating member to determine the torsional deflection thereof.

19. The engine controller system of claim 18 wherein the output signal from the processor alters the fuel injection parameters for the engine to correspond to the determined torsional deflection of said rotating member.

20. The engine controller system of claim 18 wherein the output signal from the processor alters the ignition parameters for the engine to correspond to the determined torsional deflection of said rotating member.

21. The engine controller system of claim 18 wherein the rotating member is a camshaft.

22. The engine controller system of claim 7 including at least four angular position sensors, one of said at least four angular position sensors determining the angular position of one end of a first rotating member and another of said at least four angular position sensors determining the angular position of the other end of the first rotating member, one of said at least four angular position sensors determining the angular position of one end of a second rotating member and another of said at least four angular position sensors determining the angular position of the other end of the second rotating member and wherein the processor determines and compares the angular position of each end of each of the first and second rotating members to determine the torsional deflection of each rotating member.

23. The engine controller system of claim 22 wherein the output signal from the processor alters the fuel injection parameters for the engine to correspond to the determined torsional deflections of said rotating members.

24. The engine controller system of claim 22 wherein the output signal from the processor alters the ignition parameters for the engine to correspond to the determined torsional deflections of said rotating members.

25. The engine controller system of claim 22 wherein the first and second rotating members are camshafts.

26. The engine controller system of claim 22 wherein the first rotating member is a camshaft and the second rotating member is a crankshaft.

27. The engine controller system of claim 7 wherein the engine employs variable valve timing and an output signal from the processor is used to vary the phase of the camshafts operating the valves.

28. The engine controller system of claim 1 wherein said output signal comprises a train of pulses sized and/or shaped and/or timed to provide information to a control device receiving the pulse train.

29. The engine controller system of claim 4 wherein the output control signal represents one or more parameters used to control fuel injection in the engine.

30. The engine controller system of claim 5 wherein the processor produces a second output control signal representing one or more parameters used to control ignition in the engine.

* * * * *

UNITED STATES PATENT AND TRADEMARK OFFICE
CERTIFICATE OF CORRECTION

| | | |
|---|---|---|
| PATENT NO. | : 7,188,021 B2 | Page 1 of 1 |
| APPLICATION NO. | : 11/146727 | |
| DATED | : March 6, 2007 | |
| INVENTOR(S) | : Spicer et al. | |

It is certified that error appears in the above-identified patent and that said Letters Patent is hereby corrected as shown below:

On the Cover Page, item [75] add inventor's name:

ANDREW BOYES.

Signed and Sealed this

Twenty-fourth Day of April, 2007

JON W. DUDAS
*Director of the United States Patent and Trademark Office*